June 27, 1967 R. V. WATKINS 3,328,641
WELDING TORCH IGNITER
Filed Sept. 18, 1964

INVENTOR.
RAY V. WATKINS
BY
Eugene C. Knoblock
ATTORNEY

United States Patent Office 3,328,641
Patented June 27, 1967

3,328,641
WELDING TORCH IGNITER
Ray V. Watkins, 1189 Euclid Ave.,
Benton Harbor, Mich. 49022
Filed Sept. 18, 1964, Ser. No. 397,463
10 Claims. (Cl. 317—96)

This invention relates to improvements in welding torch igniters, and more particularly to devices for igniting acetylene welding torches, soldering torches, or other fuel-burning units.

The primary object of this invention is to provide a device of electrical character utilizing a spark plug as a means to ignite an acetylene welding torch.

A further object is to provide a device which is convertible for operation by both alternating current and direct current so that the device may be used in an interior location as at a work bench, or may be operated by a battery for energization in the field, and which is portable and light in weight.

A further object is to provide a device of this character which is usable out of doors in windy conditions in which a conventional pilot flame would be blown out.

A further object is to provide a device of this character which operates instantaneously as distinguished from a device having a delayed operation, as required for creation of igniting temperature through energization of an electric heating element.

A further object is to provide a device of this character which permits ignition of an acetylene welding torch without requiring direction of the torch flame into a cabinet as would produce soot in the cabinet by reason of the initial smoky combustion flame produced upon starting an acetylene torch.

A further object is to provide a device of this character wherein starting is instantaneous so that the gas may be turned on before the torch is applied to the device for ignition purposes.

Other objects will be apparent from the following specification.

Figure 1:
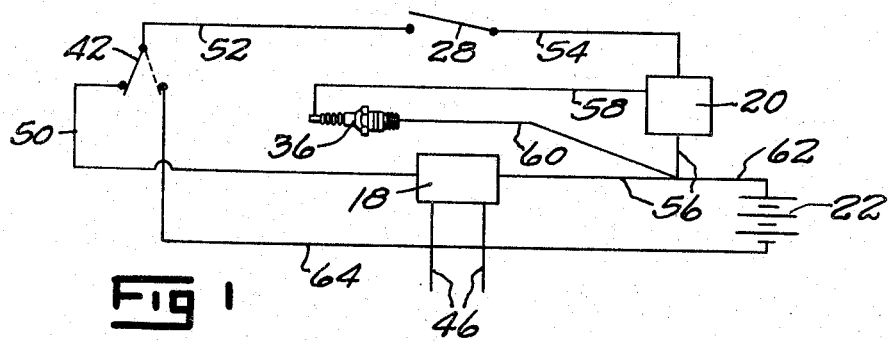
FIG. 1 is a wiring diagram illustrating the electrical circuit of the device.

Referring to the drawing, and particularly to FIGS. 2 to 5 thereof, inclusive, the numeral 10 designates a casing which is provided with a handle 12 at its upper end to accommodate convenient carrying thereof. The casing is open at one side thereof. The open side is spanned by a door or panel 14 pivoted at 16 to one marginal edge of the casing. The casing will normally be closed in use, and suitable means (not shown) may be provided in the nature of a latch to hold the door 14 closed.

The casing 10 mounts the electronic components of the device therein in convenient manner. Thus the casing may house a transformer 18, a spark coil 20 and a battery 22. Any suitable clamp or carrier means 24 may be provided to support and position the electrical components 18, 20 and 22, and this clamp carrier means is preferably provided with a releasable securing means 26 to accommodate ready and convenient assembly and mounting of the individual components in the container and their disassembly for removal and replacement. The clamping carrier means 24 will preferably fixedly mount the electrical components 18, 20 and 22, so that they will maintain selected position while the device is carried from place to place or while it is subjected to shock or impact incident to careless usage.

Figures 2, 3:
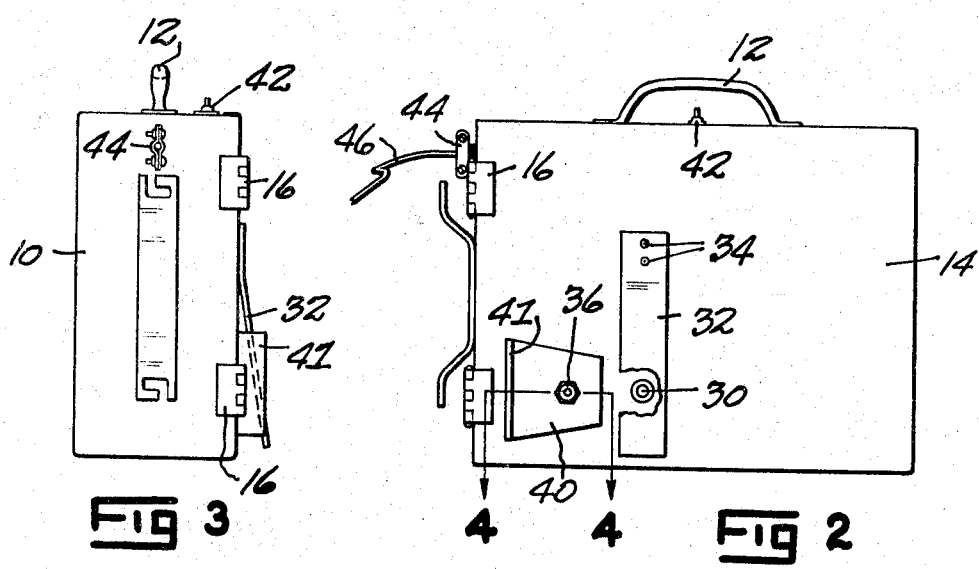
FIG. 2 is a view of the device in front elevation.
FIG. 3 is an end view of the device as viewed from the left in FIG. 2.
Figures 4, 5:
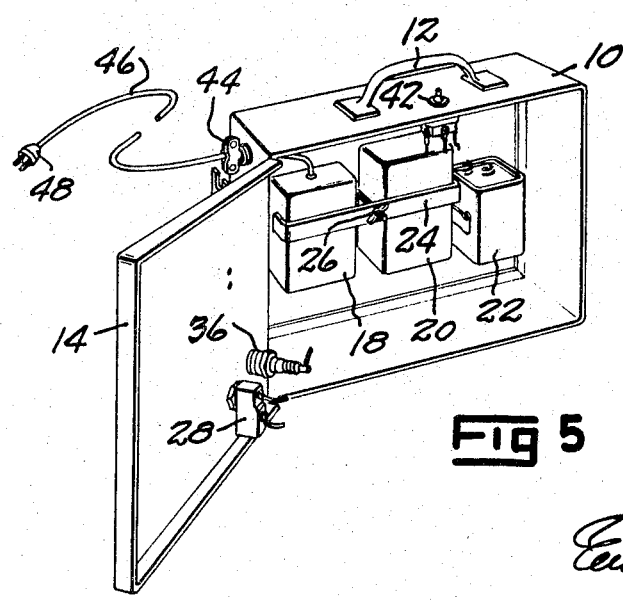
FIG. 4 is a fragmentary detail sectional view taken on line 4—4 of FIG. 2.
FIG. 5 is a perspective view of the device in open position to illustrate the component parts thereof.

One wall of the container or casing 14, and preferably the door or panel 14 thereof, carries a micro switch 28 at the inner face thereof, the same having a plunger or actuating part 30 projecting freely through an opening in the container and extending externally thereof. A leaf spring 32 is secured at one end at 34 spaced from the member 30 and is normally positioned adjacent to the plunger part 30 clear thereof and in a position to protect the plunger part 30. The spring is preferably the leaf spring type which projects angularly from the casing, as seen in FIG. 3, with its free end overlying the switch plunger 30 and is adapted to engage and actuate said switch plunger when it is pressed or deflected inwardly toward the casing.

The casing 10 mounts a spark plug 36 on the same wall or part which carries the micro switch 28. The spark plug is mounted adjacent to and alongside the micro switch preferably in laterally spaced relation thereto, and has its electrodes or terminals 38 projecting exteriorly of the casing. The portion of the casing which mounts the spark plug 36 is preferably provided with a deflector plate 40 which terminates in a lip 41 bent outwardly therefrom at the margin thereof remote from the spark plug 36 and the micro switch plunger 30.

The casing mounts a selector switch 42 which preferably is located adjacent to the handle 12, and the casing also mounts a fitting 44 through which extends an insulated electrical conductor 46 which carries a conventional connector plug 48 at its free end adapted for connection with a source of alternating current.

The electrical circuit of the device is illustrated in FIG. 1. The electrical leads 46 are connected to the transformer 18. The transformer is connected by lead 50 to one terminal of the selector switch 42. The selector switch movable contactor is connected by a lead 52 with one terminal of the micro switch 28. The other terminal of the micro switch 28 is connected by lead 54 to the spark coil 20. A lead 56 connects the spark coil 20 with the transformer 18. Lead 58 extends from the spark coil 20 to the spark plug 36, and lead 60 extends from the spark plug 36 to the lead 56. A lead 62 branches from lead 56 and is connected to the battery 22. A lead 64 connects the battery 22 to the DC terminal of the selector switch 42.

The circuit in FIG. 1 is shown in condition for energization of spark coil 20 by alternating current and is ready for operation upon actuation of the micro switch 28. The operating circuit comprises the transformer 18, the lead 50, selector switch 42, lead 52, micro switch 28, lead 54, coil 20, lead 58, spark plug 36, and leads 60 and 56 back to the transformer. When it is desired to energize the spark coil 20 by means of the battery 22, the selector switch 42 is changed in adjustment to the dotted line position shown in FIG. 1. Thereupon, when the micro switch 28 is actuated and closed, a circuit is completed from battery 22, through lead 64, selector switch 42, lead 52, micro switch 28, lead 54, spark coil 20, lead 58, spark plug 36, and leads 60 and 62 back to the battery.

The operation of the micro switch is accomplished by applying a fuel burning member, such as an acetylene welding torch head of conventional character (not shown) against the spring 32 in a position to locate its gas-ejecting tip or outlet adjacent to the spark plug electrodes 38 or applying the device against the fuel-burning member. The user may hold the torch in one hand while adjusting the gas control valves with the other hand, so as to regulate the discharge of gas from the torch. The valves will preferably be at least partly open while the torch is applied against the spring 32 so that gas will be emitted therefrom during the time that pressure on the spring 32 exerted by the user actuates the plunger 30 of the micro switch to close the operating circuit and cause sparking at the spark plug terminals 38. This sparking will ignite the torch, causing a flame to be emitted therefrom.

The initial flame emitted from an acetylene welding torch is usually characterized by a smoky or soot generating condition. This smoky flame is directed against the deflector plate 40 and its deflector lip 41 so as to deflect the flame away from the casing 10. As soon as ignition starts, the welding torch is withdrawn from the device, thereby deenergizing the micro switch and the spark plug 36.

The device is preferably of light weight and small size so that it can be carried conveniently, and also may be mounted upon a bench for interior use when connected to an electrical alternating current outlet. When it is used out of doors, it provides an effective igniter even in windy conditions since the torch tip can be located close to the spark plug so that inflammable gas ejected from the torch tip will be ignited regardless of the wind condition which exists. This is a distinct advantage over devices which require the use of a pilot flame subject to extinction in windy weather. It will also be apparent that the provision of spark coil and the spark plug provides instantaneous starting starting as distinguished from delay which would be occasioned in devices utilizing electrical heating coils for torch igniting purposes.

While the preferred embodiment of the invention has been illustrated and described, it will be understood that changes in the construction may be made within the scope of the appended claims without departing from the spirit of the invention.

I claim:

1. A welding torch igniter, comprising
a casing,
a spark plug carried by said casing with its electrodes positioned exteriorally of said casing,
a spark coil in said casing,
spark coil energizing means within said casing,
a normally open switch carried by said casing for controlling energization of said spark coil and said coil energizing means, and
switch actuating means carried by the casing adjacent to and spaced from said spark plug and exteriorally of said casing and adapted to be operated by pressing thereagainst one part of a gas burning welding torch positioned with a gas outlet second part thereof adjacent said spark plug electrodes.

2. A welding torch igniter, comprising
a casing,
a spark plug carried by said casing with its electrodes positioned exteriorally of said casing,
a spark coil in said casing,
spark coil energizing means within said casing,
a microswitch carried by said casing and having an actuator external of said casing, and
switch actuating means carried by said casing overlying and normally spaced from said switch actuator and positioned adjacent to and spaced from said spark plug to be operated by pressing thereagainst a welding torch to be ignited by said spark plug while a gas-ejecting tip of the torch is positioned adjacent to said spark plug electrodes.

3. A welding torch igniter, comprising
a casing,
a spark plug carried by said casing with its electrodes positioned exteriorally of said casing,
a spark coil in said casing,
spark coil energizing means within said casing,
a normally open switch carried by said casing alongside said spark plug for controlling energization of said spark coil and said coils energizing means and having actuating means exteriorally of said casing adjacent said electrodes, and
a leaf spring secured at one end to said casing and overlying said switch actuating means with clearance and in adjacent but spaced relation to said spark plug, whereby said spring may be deflected to close said switch by pressure exerted thereon by a part of a welding torch while a gas ejecting torch part is positioned adjacent to said electrodes.

4. A welding torch igniter, comprising
a casing,
a spark plug carried by said casing with its electrodes positioned exteriorally of said casing,
a spark coil in said casing,
spark coil energizing means within said casing,
a normally open switch carried by said casing for controlling energization of said spark coil and said coil energizing means,
switch actuating means carried by the casing adjacent to and spaced from said spark plug and exteriorally of said casing and adapted to be operated by pressing thereagainst a part of a gas burning welding torch while positioned with its gas outlet adjacent said spark plug electrodes, and
a flame deflector carried by said casing adjacent said spark plug for deflecting flame from said torch away from the said casing.

5. A welding torch igniter, comprising
a casing,
a spark plug carried by said casing with its electrodes positioned exteriorally of said casing,
a spark coil in said casing,
spark coil energizing means within said casing,
a normally open switch carried by said casing for controlling energization of said spark coil and said coil energizing means, and
switch actuating means carried by the casing adjacent to and spaced from said spark plug and exteriorally of said casing and adapted to be operated by pressing thereagainst a first part of a gas burning welding torch while positioned with a gas outlet second part thereof adjacent said spark plug electrodes,
said casing having a plurality of walls,
said switch, switch-actuating means and spark plug being mounted by a common wall.

6. An igniter for a gas-burning welding torch having spaced parts, included a gas outlet part, comprising
a casing,
a spark plug carried by said casing with its electrodes positioned exteriorally of said casing,
a spark coil in said casing,
spark coil energizing means within said casing,
a normally open switch carried by said casing for controlling energization of said spark coil and said coil energizing means, and
switch actuating means carried by the casing adjacent to and spaced from said spark plug and exteriorally of said casing and adapted to be operated by pressing thereagainst a gas burning welding torch positioned with its gas outlet part electrodes adjacent said spark plug,
said casing including a shiftable closure panel,
said spark plug, switch and switch-actuating means being mounted on said closure panel.

7. A welding torch igniter, comprising
a casing,
a spark plug carried by said casing with its electrodes positioned exteriorally of said casing,
a spark coil in said casing,
a transformer in said casing,
an electrical conductor connected to said transformer and adapted for connection to an alternating current source,
a battery in said casing,
a normally open switch carried by said casing adjacent said spark plug for controlling energization of said spark coil, and electrical circuit means connecting said spark plug, spark coil, transformer, battery and normally open switch, said circuit means including a selector switch for connecting a selected one of said transformer and said battery in said circuit to energize said spark coil when said first named switch is closed, said normally open switch including an actuating part projecting externally of said casing.

8. A welding torch igniter, comprising
a casing,
a spark plug carried by said casing with its electrodes positioned exteriorally of said casing,
a spark coil in said casing,
a transformer in said casing,
an electrical conductor connected to said transformer and adapted for connection to an alternating current source,
a battery in said casing,
a normally open switch carried by said casing adjacent said spark plug for controlling energization of said spark coil,
electrical circuit means connecting said spark plug, spark coil, transformer, battery and normally open switch,
said circuit means including a selector switch for connecting a selected one of said transformer and said battery in said circuit to energize said spark coil when said first named switch is closed,
said normally open switch including an actuating part projecting externally of said casing, and
a member carried by said casing in protective relation to and clear of said switch-actuating part and shiftable to operate said switch-actuating part.

9. A welding torch igniter comprising
a casing,
a spark plug carried by said casing with its electrodes positioned exteriorally of said casing,
a spark coil in said casing,
a transformer in said casing,
an electrical conductor connected to said transformer and adapted for connection to an alternating current source,
a battery in said casing,
a normally open switch carried by said casing adjacent said spark plug for controlling energization of said spark coil,
electrical circuit means connecting said spark plug, spark coil, transformer, battery and normally open switch,
said circuit means including a selector switch for connecting a selected one of said transformer and said battery in said circuit to energize said spark coil when said first named switch is closed,
said normally open switch including an actuating part projecting externally of said casing, and
a leaf spring secured at one end thereof to said casing spaced from said spark plug and said switch actuating part and normally overlying said switch actuating part with clearance in a position from which it can be deflected by pressure to contact and activate said switch-actuating part.

10. A welding torch igniter, comprising
a casing,
a spark plug carried by said casing with its electrodes positioned exteriorally of said casing,
a spark coil in said casing,
a transformer in said casing,
an electrical conductor connected to said transformer and adapted for connection to an alternating current source,
a battery in said casing,
a normally open switch carried by said casing adjacent said spark plug for controlling energization of said spark coil, and
electrical circuit means connecting said spark plug, spark coil, transformer, battery and normally open switch,
said circuit means including a selector switch for connecting a selected one of said transformer and said battery in said circuit to energize said spark coil when said first named switch is closed,
said normally open switch including an actuating part projecting externally of said casing,
said casing having a handle,
said selector switch having a part external of said casing.

References Cited

UNITED STATES PATENTS

| | | | |
|---|---|---|---|
| 1,560,673 | 11/1925 | Dolan | 219—208 |
| 2,013,866 | 9/1935 | Smith | 317—88 |
| 2,146,561 | 2/1939 | Cady | 317—97 |
| 2,723,337 | 11/1955 | Kempler | 219—264 X |
| 3,090,856 | 5/1963 | Rorvig | 317—95 |
| 3,245,457 | 4/1966 | Smith et al. | 158—28 |

FOREIGN PATENTS

| | | |
|---|---|---|
| 1,131,169 | 6/1962 | Germany. |
| 291,615 | 6/1928 | Great Britain. |
| 641,445 | 8/1950 | Great Britain. |
| 344,639 | 3/1960 | Switzerland. |

RICHARD M. WOOD, *Primary Examiner.*

V. Y. Mayewsky, *Assistant Examiner.*